United States Patent

Myers et al.

[11] Patent Number: 6,164,060
[45] Date of Patent: Dec. 26, 2000

[54] COMBUSTION CHAMBER/NOZZLE ASSEMBLY AND FABRICATION PROCESS THEREFOR

[75] Inventors: W. Neill Myers; Charles S. Cornelius, both of Huntsville, Ala.

[73] Assignee: The United States of America as represented by the Administrator of the National Aeronautics and Space Administration, Washington, D.C.

[21] Appl. No.: 09/134,703

[22] Filed: Aug. 14, 1998

Related U.S. Application Data

[60] Provisional application No. 60/057,004, Aug. 18, 1997.

[51] Int. Cl.$^7$ .................................................. F02K 9/00
[52] U.S. Cl. .................................... 60/253; 60/271
[58] Field of Search ................................ 60/271, 257, 253

[56] References Cited

U.S. PATENT DOCUMENTS

| | | | |
|---|---|---|---|
| 3,712,063 | 1/1973 | Andrysiak et al. | 60/265 |
| 3,863,442 | 2/1975 | Schmidt et al. | 60/258 |
| 3,871,173 | 3/1975 | McKeena | 60/258 |
| 4,738,100 | 4/1988 | Koorey | 60/256 |
| 5,212,944 | 5/1993 | Martin et al. | 60/253 |
| 5,513,489 | 5/1996 | Bussing | 60/39.38 |
| 5,579,635 | 12/1996 | Miskelly, Jr. et al. | 60/242 |
| 5,613,299 | 3/1997 | Ring et al. | 29/890.01 |

OTHER PUBLICATIONS

Simpler Combustion Chamber, Nozzle, and Fabrication Process; *NASA Tech Briefs*; Apr. 1997, p. 68; vol. 21 No. 4; Associated Business Publications Co., Ltd.; NY, NY.

*Primary Examiner*—Timothy S. Thorpe
*Assistant Examiner*—Ehud Gartenberg
*Attorney, Agent, or Firm*—Robert L. Broad, Jr.

[57] ABSTRACT

An integral, lightweight combustion chamber/nozzle assembly for a rocket engine has a refractory metal shell defining a chamber of generally frusto-conical contour. The shell communicates at its larger end with a rocket body, and terminates at its smaller end in a tube of generally cylindrical contour, which is open at its terminus and which serves as a nozzle for the rocket engine. The entire inner surface of the refractory metal shell has a thermal and oxidation barrier layer applied thereto. An ablative silica phenolic insert is bonded to the exposed surface of the thermal and oxidation barrier layer. The ablative phenolic insert provides a chosen inner contour for the combustion chamber and has a taper toward the open terminus of the nozzle.

A process for fabricating the integral, lightweight combustion chamber/nozzle assembly is simple and efficient, and results in economy in respect of both resources and time.

4 Claims, 3 Drawing Sheets

COMBUSTION CHAMBER/NOZZLE ASSEMBLY AND FABRICATION PROCESS THEREFOR

CLAIM OF BENEFIT OF PROVISIONAL APPLICATION

Pursuant to 35 U.S.C. §119, the benefit of priority from provisional application No. 60/057,004, with a filing date of Aug. 18, 1997, is claimed for this non-provisional application.

ORIGIN OF THE INVENTION

The invention described herein was made by employees of the United States Government and may be manufactured and used by the Government for governmental purposes without the payment of any royalties thereon or therefor.

BACKGROUND OF THE INVENTION

1. Field of the Invention

This invention relates generally to rocket engines. It relates in particular to a combustion chamber/nozzle assembly for a rocket engine and to a process for its fabrication.

2. Description of Related Art

Conventional combustion/chamber nozzle assemblies for rocket engines are usually actively cooled. That is, they generally contain integral cooling passages for cooling fluid within the combustion chamber and nozzle walls, which tubular cooling passages are fed by manifolds. A complex, weighty structure is presented, the fabrication of which requires the construction and assemblage of multiple piece parts through numerous procedural steps, including machining, plating, welding, and brazing. Such a complex, weighty structure, as well as its complicated method of fabrication, are both disadvantageous and in need of improvement, as is well known in this art.

SUMMARY OF THE INVENTION

It is accordingly a primary object of the present invention to provide what is lacking in the prior art, especially a simple, yet highly efficient, lightweight integral combustion chamber/nozzle assembly for a rocket engine. It is also a primary object of the present invention to provide an uncomplicated and highly reliable process for the fabrication of a simple, lightweight integral combustion chamber/nozzle assembly for a rocket engine, which process is effective and highly efficient, especially in respect of the utilization of time and materials.

These objects and other related benefits are achieved by the present invention, which in one aspect thereof is an integral, lightweight combustion chamber/nozzle assembly which has a shell of a refractory material, such as an alloy of niobium, having a configuration defining a chamber of generally frusto-conical contour. The chamber communicates at its larger end with a rocket body, and terminates at its smaller end in a tube open at its terminus, which serves as a nozzle for the rocket engine. The inner surface of the chamber has applied thereto a thermal and oxidation barrier layer, especially of a silicide or aluminum oxide. An ablative silica phenolic insert, which is bonded to the thermal and oxidation barrier layer, is configured to provide a chosen inner contour for the combustion chamber.

The ablative silica phenolic insert additionally has a taper or reduction in thickness toward the open terminus of the nozzle.

In another aspect, the present invention is a process for fabricating the integral, lightweight combustion chamber/nozzle assembly, which process is set forth in detail hereinafter.

The integral, combustion chamber/nozzle assembly according to the present invention is simple in design and is much lighter than conventional combustion chamber/nozzle assemblies, making it a highly desirable replacement assembly for these reasons alone. Moreover, the integral combustion chamber/nozzle assembly according to the present invention is not actively cooled, as are the assemblies of the prior art, so that there is no need for cooling passages therein. Fabrication is therefore greatly simplified, and accordingly accelerated, resulting in a highly desirable economy in respect of both resources and time.

During the firing operation of a rocket engine employing the integral, lightweight combustion chamber/nozzle assembly of the present invention, resins boil off from the ablative silica phenolic insert, thereby cooling the inner surface of the refractory metal shell and leaving behind a layer of char. This layer of char, along with the remaining silica phenolic layer, acts as an insulator and protects the refractory metal shell against overheating. The thickness of the ablative insert is chosen so that the layer of char does not penetrate too deeply during the design life of the combustion chamber/nozzle assembly.

During the firing operation of a rocket engine employing the integral, lightweight combustion chamber/nozzle assembly of the present invention, the temperature inside the combustion chamber/nozzle assembly decreases toward the open end of the nozzle. Therefore the thickness of the ablative silica phenolic insert is fashioned to taper down toward the open terminus of the nozzle, at which terminus the refractory metal can, along with the thermal and oxidation layer applied thereto, survive without any ablative protection.

BRIEF DESCRIPTION OF THE DRAWINGS

For a more complete understanding of the present invention, including its primary objects and attending benefits, reference should be made to the Detailed Description of the Preferred Embodiments, which is set forth below. This description should be read in conjunction with the attached drawings, wherein.

DETAILED DESCRIPTION OF THE PREFERRED EMBODIMENTS

Figure 1:
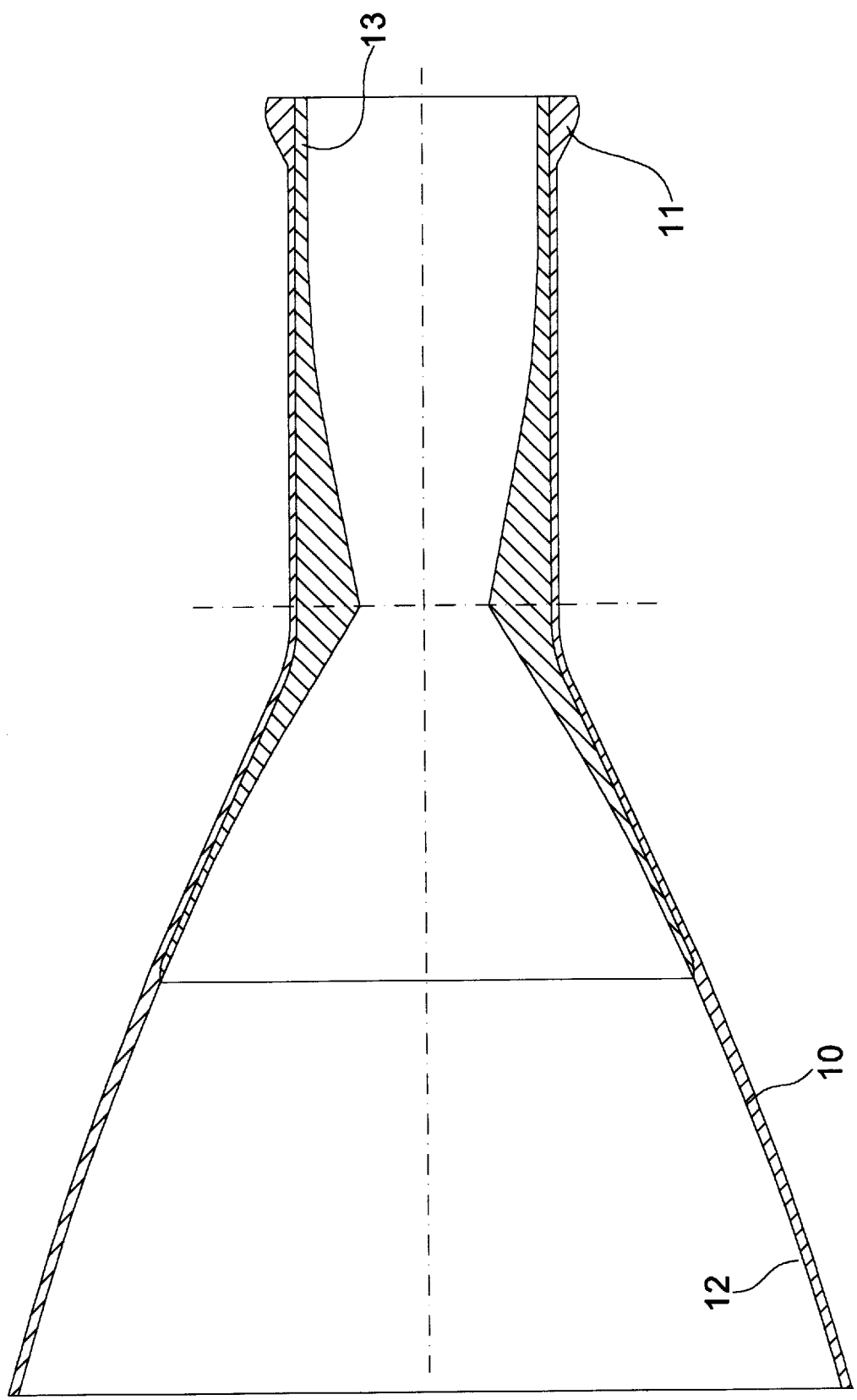
FIG. 1 is a schematic depiction of an integral, lightweight combustion chamber/nozzle assembly for a rocket engine, according to the present invention, showing the cooperative combination of its essential components.

Referring now to the drawings, FIG. 1 schematically depicts the integral, lightweight combustion chamber/nozzle assembly for a rocket engine according to the present invention as including a refractory metal shell 10 which defines a chamber of generally frusto-conical contour. Refractory metal shell 10 communicates at its base or larger end with a rocket body, and terminates at its smaller end in a tube of generally cylindrical contour which is open at the end thereof and which serves as a nozzle for the rocket engine. Projecting rim or integral flange 11 is formed at the open end of the nozzle. The refractory metal shell 10 has a protective inner layer 12 which acts as an oxidation as well as a thermal barrier. Bonded inside the shell is an ablative silica phenolic insert 13.

Figure 2:
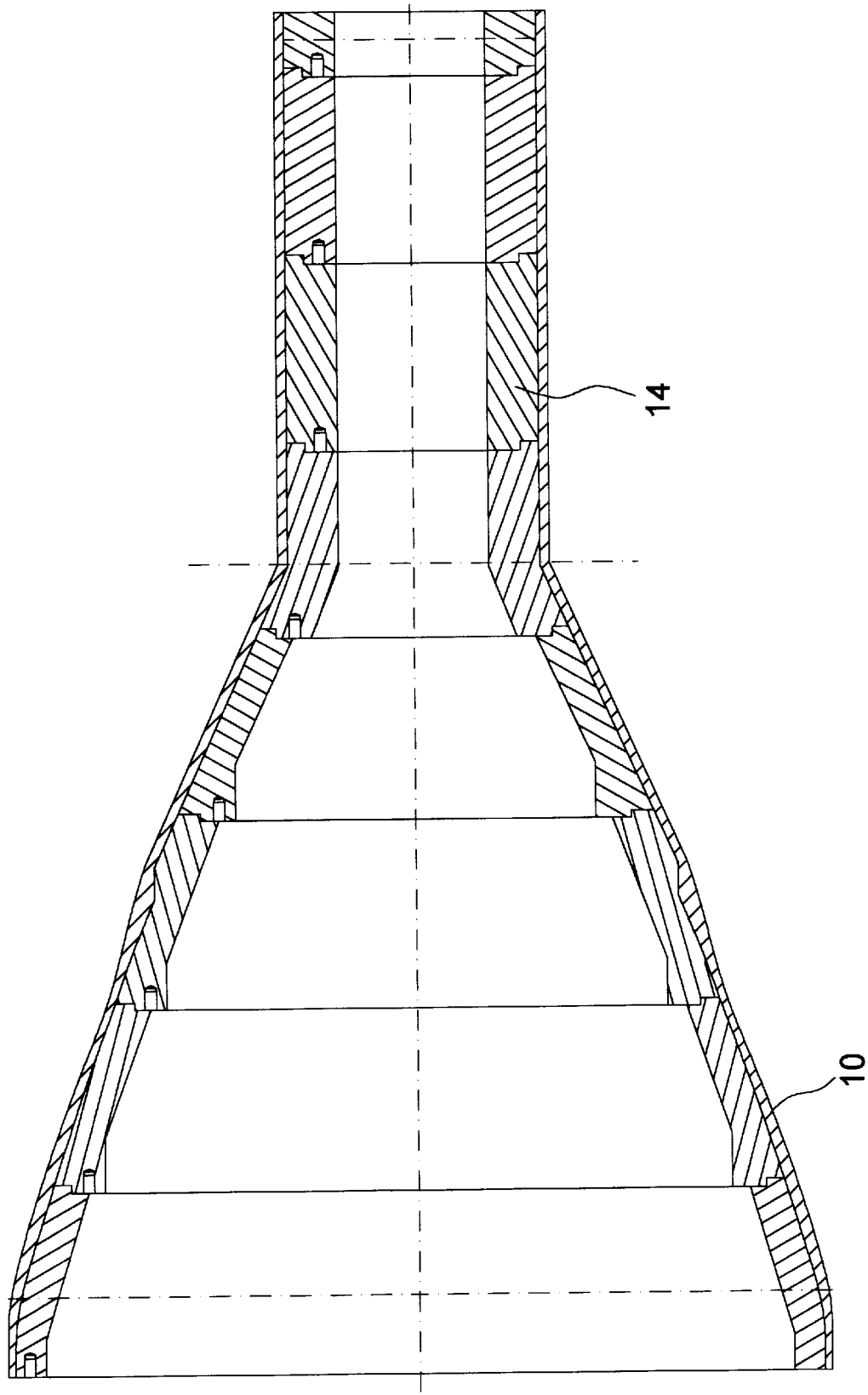
FIG. 2 schematically depicts a refractory metal shell sprayed onto a graphite mandrel by vacuum plasma spraying, according the process of the present invention.
Figure 3:
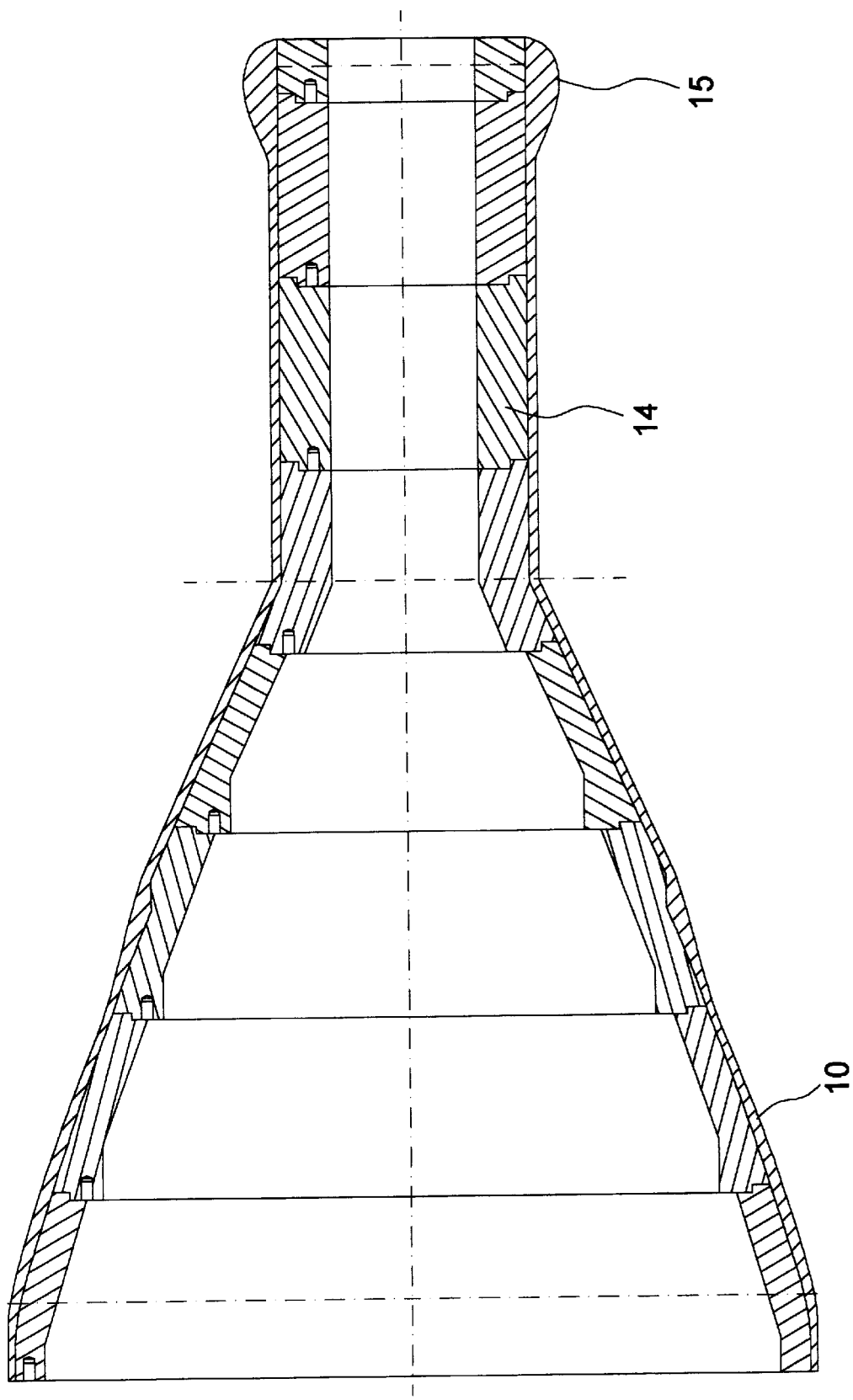
FIG. 3 schematically depicts a vacuum plasma sprayed shell of a refractory metal deposited on a graphite mandrel with additional material deposited so that a flange can be machined after the mandrel has been removed.

The shell 10 is manufactured from a refractory niobium alloy such as Niobium (Columbium) C-129Y, which is available commercially. The method of manufacture consists of vacuum plasma spraying (VPS) the alloy 10 on a graphite mandrel 14, as seen in FIG. 2, using standard techniques, well known in the art. The inner protective layer 12 may be applied by either VPS or by coating. The VPS method applies a layer such as aluminum oxide to the graphite mandrel and then transitions into the refractory alloy. Using this option, VPS is started-initially with the thermal and oxidation barrier material such as aluminum oxide, and then a gradual transition is made to the refractory metal, followed by continuing with the refractory metal to provide the required thickness thereof. An alternative method is to apply a silicide coating by standard methods to the shell interior after it has been removed from the mandrel. The difference between the coefficients of thermal expansion of the refractory metal and the graphite permits the shell to be easily removed from the mandrel after the parts cool following the VPS process. FIG. 3 shows a vacuum plasma sprayed shell 10 deposited on the graphite mandrel 14 with additional material 15 deposited on the small end so a flange can be machined after the mandrel is removed. Another method of fabricating the flange is to machine it from wrought material and then weld it onto the VPS deposited shell.

The ablative silica phenolic insert, 12, is made by wrapping commercially available silica phenolic tape on a steel mandrel which is configured to produced the desired inner contour of the combustion chamber. The tape is laid up at an angle to the part centerline, so that the edge of the tape will be exposed to the high internal temperatures. This tape wrapped billet is cured using standard techniques and then the exterior is machined to match the interior of the refractory metal shell. The ablative insert is then bonded onto the inside of the metal shell, completing the combustion chamber/nozzle assembly.

The silica phenolic insert takes advantage of an ablative process. During a firing of the rocket engine, resins boil off from the silica phenolic, cooling the surface of the refractory metal shell and forming a char layer. This layer acts as an insulator, protecting the refractory metal shell. The ablative thickness is chosen such that the char layer will not penetrate too deeply during the design life of the unit. As the temperature drops toward the exit of the nozzle, the ablative insert is extended to a point where the temperature is low enough to be handled by the refractory metal in combination with its protective inner layer or coating.

If the temperature of the interface between the ablative insert and the refractory metal shell is too high to achieve a reliable bond, mechanical attachment, such as pinning, can be incorporated.

We claim:

1. An integral, lightweight combustion chamber/nozzle assembly for a rocket engine, which assembly comprises:

a shell of a refractory metal having a configuration defining a chamber of generally frusto-conical contour, the refractory metal shell having an inner and an outer surface and communicating at its base or larger end with a rocket body, and terminating at its smaller end in a tube of generally cylindrical contour which is open at the terminus thereof and which serves as a nozzle for the rocket engine;

the entire inner surface of the refractory metal shell having applied thereto a thermal and oxidation barrier layer; and an ablative silica phenolic insert bonded to the exposed surface of the thermal and oxidation barrier layer and configured to provide an inner contour for the combustion chamber, the ablative silica phenolic insert having a taper or gradual reduction in thickness thereof toward the open terminus of the nozzle.

2. The integral, lightweight combustion chamber/nozzle assembly of claim 1, wherein the refractory metal is an alloy of niobium.

3. The integral, lightweight combustion chamber/nozzle assembly of claim 2, wherein the thermal and oxidation barrier layer is a silicide.

4. The integral, lightweight combustion chamber/nozzle assembly of claim 2, wherein the thermal and oxidation barrier layer is aluminum oxide.

* * * * *

UNITED STATES PATENT AND TRADEMARK OFFICE
CERTIFICATE OF CORRECTION

PATENT NO.   : 6,164,060
DATED        : December 26, 2000
INVENTOR(S)  : W. Neill Myers and Charles S. Cornelius Page 1 of 1

It is certified that error appears in the above-identified patent and that said Letters Patent is hereby corrected as shown below:

Title page,
ABSTRACT, replace "larger" with -- smaller --. Also, in the same sentence, line 5, replace "smaller" with -- larger --, delete "tube of", and replace "cylindrical" with -- conical --.

Column 1,
Line 57, replace "larger" with -- smaller --. Also, in the same sentence, line 58, replace "smaller" with -- larger -- and replace "tube" with -- cone --.

Column 2,
Line 20, replace "refractory metal shell" with -- insert --.
Line 66, replace "larger" with -- smaller --. Also, in the same sentence, line 67, replace "smaller" with -- larger --.

Column 3,
Line 1, delete "tube of" and replace "cylindrical" with -- conical --.
Line 4, replace "nozzle" with -- chamber --.

Column 4,
Lines 1-2, replace "refractory metal shell" with -- insert --.

Claim 1,
Line 6, replace "larger" with -- smaller --.
Line 7, replace "smaller" with -- larger --
Line 8, delete "tube of" and replace "cylindrical" with -- conical --.

Signed and Sealed this

Twenty-fifth Day of December, 2001

*Attest:*

*Attesting Officer*

JAMES E. ROGAN
*Director of the United States Patent and Trademark Office*